United States Patent [19]

Kroh et al.

[11] 4,212,975

[45] Jul. 15, 1980

[54] PROCESS FOR THE MANUFACTURE OF THE GAMMA-CRYSTAL MODIFICATION OF LINEAR TRANS-QUINACRIDONE

[75] Inventors: Adolf Kroh, Selters; Otto Fuchs, Frankfurt am Main; Ernst Spietschka, Idstein, all of Fed. Rep. of Germany

[73] Assignee: Hoechst Aktiengesellschaft, Frankfurt, Fed. Rep. of Germany

[21] Appl. No.: 952,661

[22] Filed: Oct. 19, 1978

[30] Foreign Application Priority Data

Oct. 22, 1977 [DE] Fed. Rep. of Germany ....... 2747508

[51] Int. Cl.$^2$ ............................................ C09B 48/00
[52] U.S. Cl. ................................. 546/49; 106/288 Q
[58] Field of Search ...................... 546/49; 106/288 Q

[56] References Cited

U.S. PATENT DOCUMENTS

| | | | |
|---|---|---|---|
| 3,257,405 | 6/1966 | Gerson et al. | 546/49 |
| 3,265,699 | 8/1966 | Jaffe | 546/49 |
| 4,100,162 | 7/1978 | North | 546/49 |

FOREIGN PATENT DOCUMENTS 657694  2/1963  Canada ............................ 106/288 Q

*Primary Examiner*—Donald G. Daus
*Assistant Examiner*—Diana G. Rivers
*Attorney, Agent, or Firm*—Curtis, Morris & Safford

[57] ABSTRACT

Unsubstituted linear trans-quinacridone of the gamma-crystal modification is obtained by cyclization of 2,5-dianilino-terephthalic acid with the 2.5 to 4-fold quantity of polyphosphoric acid or of an acidic polyphosphoric acid methyl ester, followed by hydrolysis of the condensation product in water, intensive grinding of the aqueous crude quinacridone in the presence of an alcohol or ketone and heating of the resulting product to 80° to 200° C.

11 Claims, No Drawings

PROCESS FOR THE MANUFACTURE OF THE GAMMA-CRYSTAL MODIFICATION OF LINEAR TRANS-QUINACRIDONE

The present invention relates to a process for the manufacture of the gamma-crystal modification of the unsubstituted linear trans-quinacridone.

The gamma-modification of the linear trans-quinacridone has achieved considerable importance in the pigmentation of lacquers and paints and in the coloration of plastics, since it is one of the fastest red pigments. It may be obtained in various ways:

According to U.S. Pat. No. 2,844,581 the gamma-crystal phase of linear quinacridone is obtained by salt grinding of crystalline linear quinacridone—the latter being obtained by cyclization of 2,5-dianilino-3,6-dihydro-dialkylterephthalate in indifferent solvents at a temperature of from 225° to 300° C. followed by oxidation of the isolated dihydroquinacridone with mild oxidants, according to U.S. Pat. No. 2,821,529—and by treating the ground product with dimethylformamide.

French Pat. Nos. 1,226,825 and 1,233,785, British Pat. No. 868,360 and Belgian Pat. No. 611,271 disclose the preparation of linear quinacridone by cyclization of 2,5-dianilino-terephthalic acid in acid condensation agents.

Suitable condensation agents are in particular polyphosphoric acid and the acidic esters thereof. The amorphous highly agglomerated crude quinacridone which is obtained in this cyclization process in a poorly crystalline form of the gamma-modification of quinacridone, may be converted into the gamma-modification of the quinacridone according to the method disclosed in German Pat. No. 1,268,586, by heating, optionally under pressure, to 100° to 200° C. in solvent-water mixtures. When operating according to the above described process and using less than the 5-fold quantity of said acid condensation agents—calculated on the quantity of 2,5-dianilino-terephthalic acid—for the cyclization, which is desirable for reasons of reduced waste water pollution and of cost savings, a complete conversion of the crude quinacridones so obtained into the pure gamma-modification is not successful, especially when using solvents which are easy to handle technically, easy to regenerate and cheap, such as alcohols and ketones. However, it is just the use of these solvents, which is important for the technical performance of this process, since these solvents can be removed practically quantitatively from the pigment suspension after the treatment of the quinacridone, by simple distillation or suitably by steam distillation, and be reused directly or after rectification. Because of the practically quantitative regenerability, neither the water nor the air are polluted by solvents.

A smooth conversion into the gamma-modification is successful only when the crude quinacridone is subjected to an extraction with alkali prior to finishing, for example in the manner described in German Pat. No. 1,148,881, Example 1. When omitting this step, there are obtained red-violet products which contain in addition to the gamma-modification considerable quantities of the red-violet β-modification of the quinacridone.

It has now been found that a perfect conversion of the crude quinacridone into the pure gamma-crystal modification may be reached without prior extraction with alkali, when subjecting the aqueous suspension of the crude quinacridone which has been obtained by cyclization of 2,5-dianilino-terephthalic acid in polyphosphoric acid or in an acidic polyphosphoric acid methyl ester followed by hydrolysis, to intensive wet grinding in the presence of alcohols or ketones. The desagglomerated crude quinacridone of the α-phase obtained is converted without difficulty into the pure gamma-phase by heating.

The present invention, consequently, provides a process for the manufacture of the gamma-modification of the unsubstituted linear trans-quinacridone by cyclization of 2,5-dianilino-terephthalic acid with polyphosphoric acid or an acidic polyphosphoric acid methyl ester as condensation agent and subsequent hydrolysis in water, which comprises performing the cyclization by using the 2,5-fold to 4-fold quantity by weight of condensation agent, calculated on 2,5-dianilino-terephthalic acid, and submitting the aqueous suspension of the crude quinacridone obtained after hydrolysis to intensive grinding in the presence of an alcohol or ketone and heating the resulting suspension to a temperature of from 80° to 200° C.

Some preferred embodiments of the process of the invention are described hereinafter:

Cyclization is performed preferably at a temperature of from about 100° to 150° C., in particular 120° to 130° C. by using approximately the 3-fold quantity of condensation agent. Subsequently, the molten product is added to approximately 10 times the quantity of water, preferably ice water, to achieve hydrolysis and the crude quinacridone is isolated, preferably filtered off, and washed neutral with water.

The resulting water-moist crude quinacridone of about 20 to 22 weight percent purity is suitably stirred with about 2 to 5 times the quantity of solvent, calculated on the content of quinacridone, and optionally with a further quantity of water, followed by wet grinding. The desagglomerated crude quinacridone of the α-crystal phase thus obtained is thereafter heated to a temperature of from 100° to 170° C., preferably 125° to 160° C., in particular 125° to 150° C., in a closed vessel for about 4 to 6 hours.

Suitable wet grinding machines for the process of the invention include, for example, colloid mills, corundum disk mills, dissolvers or agitator bead mills and similar apparatuses.

Suitable solvents for the process of the invention are preferably lower alcohols and ketones, in particular alkanols and dialkylketones each having up to 6 carbon atoms, for example methanol, ethanol, n-propanol, isopropanol, n-butanol, secondary butanol, iso-butanol, pentanol, hexanol, acetone, methyl-ethylketone, diethylketone or methylisobutylketone. It is possible to eliminate the water prior to heating, preferably, however, heating is carried out in an aqueous-organic medium.

The pigments obtained by the process of the invention represent the pure gamma-crystal modification of the linear quinacridone. They are distinguished by high tinctorial strength, a pure shade and a good dispersibility in lacquers and in the coloration of plastics.

It was surprising that the crude quinacridone, which is present as a loose agglomerate of extremely fine particles, can be brought into a form which can be converted into the gamma-crystal modification without difficulty according to this invention.

The following examples illustrate the invention. Percentages are by weight unless otherwise stated.

EXAMPLE 1

10 Parts by weight of 2,5-dianilino-terephthalic acid are introduced into 30 parts by weight of polyphosphoric acid having a $P_2O_5$ content of 84.2%, at 110° to 120° with stirring. The batch is stirred for 1 to 2 hours at 120° to 130° C. The hot melt is hydrolyzed by pouring it into 90 parts by weight of water and the precipitated crude quinacridone is filtered off and washed until free of acid.

The crude water-moist quinacridone obtained (solids content about 22%) is stirred with 48 parts by weight of methyl-isobutylketone and 12 parts by weight of water and ground twice in a colloid mill ("PUC" mill). The quinacridone suspension is heated in a closed vessel to 140° to 150° C. and kept at this temperature for 4 hours with stirring. After cooling to 80° C., the ketone is distilled off with steam, the pigment is filtered off, washed with water and dried. The resulting bluish-red pigment is the linear quinacridone in the pure gamma-crystal form. It is distinguished by grain softness, good dispersibility and a very pure shade.

COMPARATIVE EXAMPLE

When heating the crude quinacridone directly to 140° to 150° C. after stirring and keeping it at this temperature for 4 hours, there is obtained a product by far bluer than that obtained in Example 1, which contains considerable quantities of the $\beta$-phase in addition to the gamma-modification.

EXAMPLE 2

2 Parts by weight of the moist crude quinacridone (solids content about 22%) obtained as in Example 1 are stirred with 1 part by weight of 96% ethyl alcohol, and 2 parts by weight of water. The suspension is ground four times in a toothed disk mill. The resulting pasty mixture is heated to 125° to 135° C. while stirring in a closed vessel and kept for 4 hours at this temperature. After cooling to 70° C., the ethyl alcohol is distilled off, the pigment is filtered off and dried. There is obtained the linear quinacridone in the pure gamma-crystal form.

COMPARATIVE EXAMPLE

When carrying out heating to 125° to 135° C. without previous grinding and when stirring at this temperature, there is obtained a pigment which contains in addition to the gamma-modification the $\beta$-modification, and the shade of which is bluer.

EXAMPLE 3

3 Parts by weight of 2,5-dianilino-terephthalic acid are added while stirring to 9 parts by weight of acidic polyphosphoric acid methyl ester having a $P_2O_5$ content of from 81.5 to 82.5%, at a temperature of from 120° to 125° C., thereby effecting condensation to yield the linear quinacridone. The cyclized molten product is hydrolyzed in 30 parts by weight of water. The precipitated crude quinacridone is filtered off and washed until free of acid.

The resulting water-moist crude quinacridone of about 20 to 22% concentration is stirred with 18 parts by weight of isobutanol of about 80% concentration and subsequently ground in a toothed disk mill ("Supraton mill"). The resulting mixture is heated to 140° to 160° C. while stirring and kept for 4 hours at this temperature. After cooling to 80° C. the isobutanol is distilled off with steam, the pigment is filtered off, washed with water and dried. The bluish-red pigment, which is readily dispersible in lacquers and has a high tinctorial strength, is present in the gamma-crystal modification.

COMPARATIVE EXAMPLE

When heating to the finish temperature without previous grinding, there is obtained a red-violet pigment which contains in addition to the gamma-phase distinct quantities of the $\beta$-phase.

EXAMPLE 4

100 Parts by weight of the crude moist quinacridone (solids content about 22%) are stirred with 75 parts by weight of acetone and 75 parts by weight of water and ground twice in an agitator bead mill. Subsequently the suspension is heated while stirring to 140° to 150° C. in a closed vessel and kept for 6 hours at this temperature. The cooled mixture is filtered, the residue is washed with water and dried. The linear quinacridone is obtained in the pure gamma-crystal form.

COMPARATIVE EXAMPLE

When heating to the finish temperature without grinding and isolating the resulting product after cooling, there is obtained a red-violet quinacridone of the gamma-phase containing also the $\beta$-phase.

What is claimed is:

1. A process for making the gamma-crystal modification of the unsubstituted linear trans-quinacridone which comprises cyclizing 2,5-dianilino-terephthalic acid with a 2,5-fold to 4-fold quantity by weight of a condensing agent that is polyphosphoric acid or an acidic polyphosphoric acid methyl ester, hydrolyzing the reaction mixture in water to form crude quinacridone agglomerates, separating the crude quinacridone agglomerates and mixing them with a solvent selected from alcohols and ketones having up to 6 carbon atoms, intensively milling the quinacridone agglomerates in admixture with the solvent and heating the resulting mixture to a temperature of 80° C. to 200° C.

2. The process as claimed in claim 1, which comprises heating the suspension after grinding to 100° to 170° C.

3. The process as claimed in claim 1, which comprises heating the suspension after grinding to 125° to 160° C.

4. The process as claimed in claim 1, which comprises carrying out cyclization with a three-fold quantity of condensation agent.

5. The process as claimed in claim 1, which comprises carrying out cyclization at a temperature of from 100° to 150° C.

6. The process as claimed in claim 1, which comprises carrying out cyclization at 120° to 130° C.

7. The process as claimed in claim 1, which comprises carrying out grinding with the addition of a two- to five-fold quantity of solvent, calculated on the quinacridone.

8. The process as claimed in claim 1, which comprises heating the suspension obtained on grinding in a closed vessel while stirring.

9. The process as claimed in claim 1, which comprises heating the suspension obtained on grinding for 4 to 6 hours.

10. The process as claimed in claim 1, which comprises isolating the crude quinacridone obtained on hydrolyzing.

11. The process as claimed in claim 1, which comprises washing neutral the crude quinacridone obtained on hydrolyzing.

* * * * *